United States Patent
Bhatt et al.

(10) Patent No.: US 9,495,360 B2
(45) Date of Patent: Nov. 15, 2016

(54) RECIPE CREATION USING TEXT ANALYTICS

(71) Applicant: International Business Machines Corporation, Armonk, NY (US)

(72) Inventors: Dhruv A. Bhatt, Indian Trail, NC (US); David B. Werts, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 363 days.

(21) Appl. No.: 14/170,053

(22) Filed: Jan. 31, 2014

(65) Prior Publication Data

US 2015/0220603 A1 Aug. 6, 2015

(51) Int. Cl.
G06F 17/30 (2006.01)
G06F 17/28 (2006.01)
G06F 17/27 (2006.01)
G06Q 10/10 (2012.01)

(52) U.S. Cl.
CPC ............ *G06F 17/28* (2013.01); *G06F 17/277* (2013.01); *G06F 17/30696* (2013.01); *G06F 17/30864* (2013.01); *G06Q 10/10* (2013.01)

(58) Field of Classification Search
CPC .................. G06F 17/30554; G06F 17/30572
See application file for complete search history.

(56) References Cited

U.S. PATENT DOCUMENTS

| 8,145,854 | B1 * | 3/2012 | Lee .......................... A23L 1/00 711/154 |
| 8,412,579 | B2 | 4/2013 | Gonzalez |
| 8,419,434 | B2 | 4/2013 | Do et al. |
| 8,849,805 | B2 * | 9/2014 | Osaki ..................... G06Q 10/10 705/26.5 |
| 9,098,588 | B2 * | 8/2015 | Chung ................ G06Q 30/0251 |
| 2010/0153209 | A1 | 6/2010 | de Rubertis et al. |
| 2012/0136864 | A1 | 5/2012 | Ochtel |
| 2012/0317505 | A1 | 12/2012 | Schwartz et al. |
| 2012/0322032 | A1 | 12/2012 | Smith |
| 2013/0149679 | A1 | 6/2013 | Tokuda et al. |
| 2013/0183642 | A1 | 7/2013 | Wan |
| 2013/0185646 | A1 | 7/2013 | Wiggins et al. |
| 2014/0074830 | A1 * | 3/2014 | Kamei .................. G06Q 10/00 707/723 |

OTHER PUBLICATIONS

Kawano et al.; "MIRURECIPE: A Mobile Cooking Recipe Recommendation System With Food Ingredient Recognition", Multimedia and Expo Workshops (ICMEW), 2013 IEEE International Conference on Jul. 15-19, 2013, pp. 1-2.

Wang et al.; "Accommodating Substructure Similarity-Based Search in a Recipe Database System", Digital Ecosystems and Technologies, DEST 2008, Second IEEE International Conference on Feb. 26-29, 2008, pp. 91-96.

Xie et al.; "A Hybrid Semantic Item Model for Recipe Search by Example", Multimedia (ISM) 2010, IEEE International Symposium on, Dec. 13-15, 2010, pp. 254-259.

Ide et al.; "Multimedia Supplementation to a Cooking Recipe Text for Facilitating Its Understanding to Inexperienced Users", Multimedia (ISM) 2010, IEEE International Symposium on, Dec. 13-15, 2010, pp. 242-247.

List of IBM Patents or Patent Applications Treated as Related.
Bhatt et al.; "New Recipe Creation Using Text Analytics", U.S. Appl. No. 14/557,101, filed Dec. 1, 2014.

* cited by examiner

*Primary Examiner* — Cheryl Lewis

(74) *Attorney, Agent, or Firm* — Patterson + Sheridan, LLP

(57) ABSTRACT

Embodiments presented herein provide techniques for generating a recipe using text analytics methods. A server application receives a search query for a specified dish (e.g., from a client computer). The application retrieves recipes relevant to the specified dish (e.g., by crawling websites on the Internet) and extracts text from each recipe. The application performs a variety of text analytics methods on the text to identify different ingredients and preparation methods in creating the dish. Additional analytics are performed to loosely predict a recipe that conforms to the search query as well as dietary restrictions of a user.

12 Claims, 5 Drawing Sheets

Dish: Vegetable lasagna ~205

Cooking method ~210: ANY

Prep Time ~215: ANY

Include ingredients ~220

Exclude ingredients ~225: Mushrooms

Dietary restrictions ~230:
- ☐ Dairy-free
- ☐ Gluten-free
- ☐ Low-cal
- ☐ Low-carbs
- ☐ Low-fat
- ☒ Low-sodium
- ☐ Vegan
- ☒ Vegetarian Search ~235

Clear ~240

INTERFACE 200

FIGURE 2

RECIPE CREATION USING TEXT ANALYTICS

BACKGROUND

1. Technical Field

Embodiments disclosed herein relate to text analytics. More specifically, embodiments provide techniques for generating culinary recipes by applying text analytics techniques on unstructured recipe texts.

2. Description of the Related Art

Text information is often voluminous and unstructured. To use large amounts of text information for a particular purpose, the information often needs to be structured based on its language and content. Text analytics describes a set of linguistic, statistical, and machine learning techniques that model and structure the information content of textual sources. Such techniques process the text information to identify structures, common meanings, and relationships between different words and word phrases. Through these techniques, organizations and individuals alike may extract value from the processed information. As more content becomes available on the Internet, text analytics becomes of increasing importance.

Text analytics has applications in a variety of contexts. For example, consider culinary recipes, which are increasingly shared over the Internet through recipe websites, food blogs, and the like. Many culinary recipes may describe a variety of ingredients and methods for preparing a given dish. For example, one recipe for a pasta dish may specify a different set of herbs compared to another recipe. Further, one recipe may specify a different preparation method compared to another recipe (e.g., boiling or baking the pasta dish). Generally, when an individual searches online for a recipe for a particular dish, the individual may receive hundreds of results. Because the results are numerous, the individual often may consider only the first few hits and disregard the rest, without any regard to the quality of the remaining recipes. Additionally, an individual may have specific dietary needs, so the individual might have difficulty obtaining a recipe that suits these needs.

SUMMARY

Embodiments presently disclosed herein provide a computer-implemented method. The method generally includes receiving, via a processor, a recipe request. The recipe request specifies a dish and a set of criteria. The method also includes retrieving a plurality of recipe texts corresponding to the specified dish. The method also includes parsing each of the recipe texts to identify one or more ingredients and one or more methods used in preparing the specified dish and to associate metadata to one or more of the identified ingredients and methods. The method also includes generating, from the associated metadata of the identified ingredients and methods, a statistical model for preparing the specified dish. The method also includes generating a combination of the identified ingredients and methods for preparing the specified dish based on the specified set of criteria and the statistical model.

Another embodiment of the invention includes a computer program product, the computer program product comprising a computer usable medium having computer usable program code having instructions for causing a processor to perform an operation. The operation generally includes receiving a recipe request. The recipe request specifies a dish and a set of criteria. The operation also includes retrieving a plurality of recipe texts corresponding to the specified dish. The operation also includes parsing each of the recipe texts to identify one or more ingredients and one or more methods used in preparing the specified dish and to associate metadata to one or more of the identified ingredients and methods. The operation also includes generating, from the associated metadata of the identified ingredients and methods, a statistical model for preparing the specified dish. The operation also includes generating a combination of the identified ingredients and methods for preparing the specified dish based on the specified set of criteria and the statistical model.

Still another embodiment of the invention includes a system having a processor and a memory containing an operation. The operation generally includes receiving a recipe request. The recipe request specifies a dish and a set of criteria. The operation also includes retrieving a plurality of recipe texts corresponding to the specified dish. The operation also includes parsing each of the recipe texts to identify one or more ingredients and one or more methods used in preparing the specified dish and to associate metadata to one or more of the identified ingredients and methods. The operation also includes generating, from the associated metadata of the identified ingredients and methods, a statistical model for preparing the specified dish. The operation also includes generating a combination of the identified ingredients and methods for preparing the specified dish based on the specified set of criteria and the statistical model.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 illustrates an example search query interface of a client application used to communicate with a server application, according to one embodiment.

DETAILED DESCRIPTION

Embodiments presented herein provide techniques for generating customized recipes based on text analytics. In one embodiment, a server application receives a search query from a user. The search query may specify a dish by name as well as other criteria, such as dietary restrictions, desired preparation methods, and desired ingredients. In response to the query, the application retrieves recipe texts corresponding to the dish from different sources (e.g., recipe websites, cookbooks in text or e-book format, restaurant menus, etc.). The server application may process the recipe texts (e.g., through natural language processing techniques, parsing, tokenization, etc.) to annotate identified ingredients and preparation methods. The application analyzes the annotated data to determine a recipe. For example, the application may create predictive models used to determine a recipe that conforms to user-specified criteria. Thereafter, the application generates a recipe based on the analysis and returns the recipe to the user.

Because culinary recipes are typically unstructured and do not share a common format across different sources, performing text analytics on the recipes allows many possibilities for creating a certain dish to be determined. As a result, the recipes generated based on analyses of text analytics output may serve the needs of a user by both identifying ingredients and preparation methods desired by the user and identifying ingredients and methods that conform to the user's dietary needs.

Figure 1:
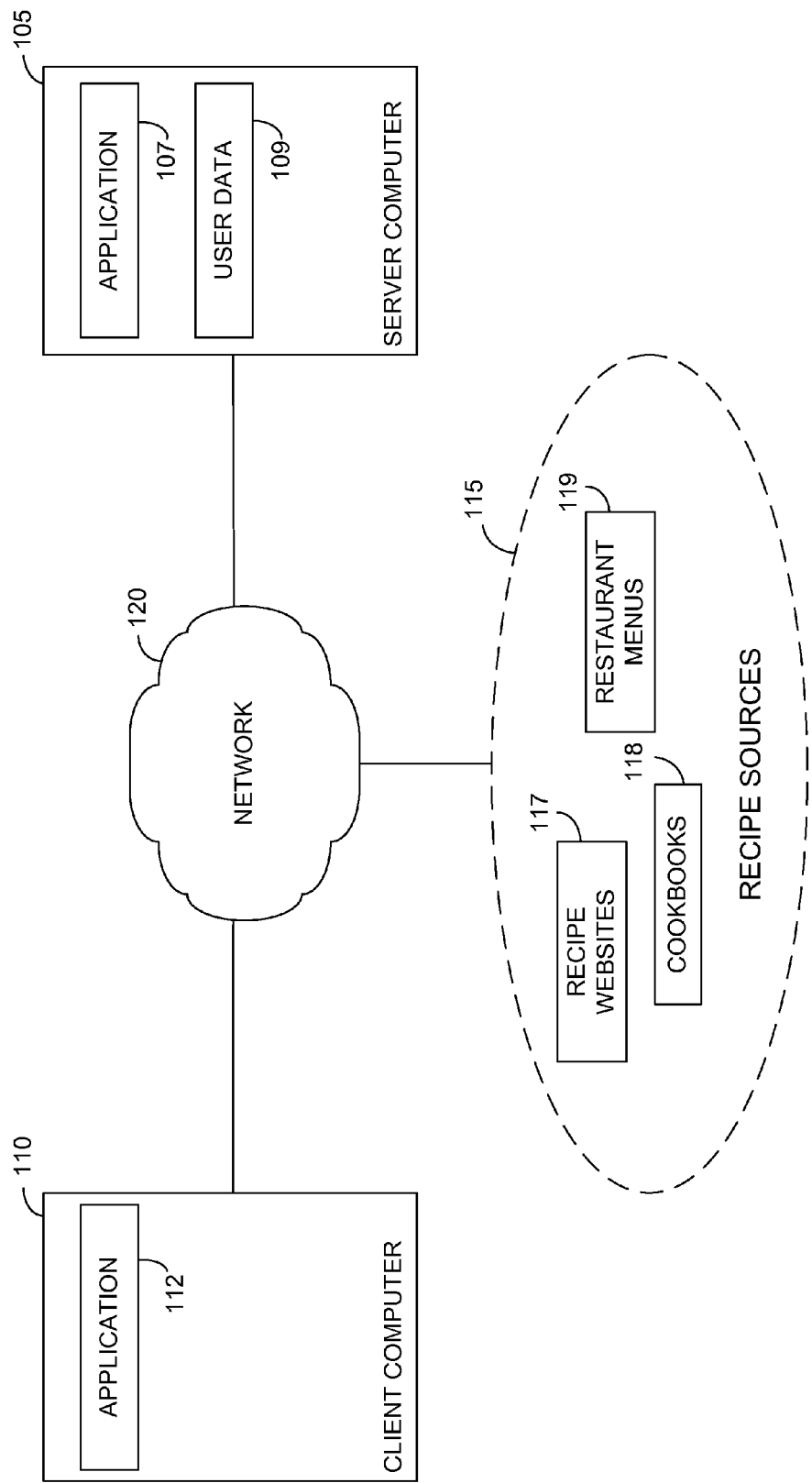
FIG. 1 illustrates an example computing environment, according to one embodiment.

FIG. 1 illustrates an example computing environment 100, according to one embodiment. As shown, the computing environment 100 includes a server computer 105. A server computer 105 hosts an application 107 that provides a service accessed by multiple client computers 110 over a network 120 (e.g., the Internet) to an application 112 executing on the client computer 110. Specifically, the application 107 generates recipes based on analysis of data annotated through text analytics techniques. Server computer 105 may be a physical computing system (e.g., a system in a data center) or may be a virtual computing instance executing within a computing cloud. In general, the network 115 may be a telecommunications network and/or a wide area network (WAN).

The application 107 performs text analytics techniques on recipes to identify ingredients and cooking methods for a recipe. In one embodiment, after receiving a search query from a user, the application 107 retrieves recipe texts from various recipe sources 115 corresponding to the dish specified in the search query. Examples of recipe sources 115 may include recipe websites 117, cookbooks 118 (e.g., in a scanned or ebook format), or restaurant menus 119. Once collected, the application 107 uses text analytics methods on the recipes to identify each ingredient and preparation method used to create the dish. For example, the application 107 may use a set of dictionaries and parsing rules to determine common language constructs and tokenize terms. Further, the application 107 uses the text analytics methods to annotate the ingredients and preparation methods, such as nutritional information and other properties for each ingredient. Once annotated, the application 107 may generate a recipe that conforms to the search query.

FIG. 2 illustrates an example search query interface 200 of a client application 112 used to communicate with the server application 107, according to one embodiment. The interface 200 allows a user to create a search query for recipes corresponding to a particular dish. To do so, a user enters the name of a dish in a dish field 205. Illustratively, the user has entered "Vegetable lasagna" in the dish field 205. Once entered, the user may click a search button 235 to send the search query to the server application 107 (or alternatively, clear the query by clicking a clear button 240).

Before submitting the query to the application 107, the user may specify additional criteria for the requested dish through the interface 200. For example, interface 200 provides dropdown boxes 210 and 215 that allow the user to specify different cooking methods (e.g., frying, baking, sous-vide, etc.) and preparation times. Further, the user may also list ingredients to be included or excluded in a generated result in fields 220 and 225. Illustratively, the user has specified to exclude mushrooms from results in the field 225. Additionally, the user may select various dietary restrictions to which the generated result should conform. As shown, the interface 200 lists several dietary restrictions: dairy-free, gluten-free, low-cal, low-carbs, low-fat, low-sodium, vegan, and vegetarian. Of course, the interface 200 may be configured to allow the user to specify further criteria in the search.

Figure 3:
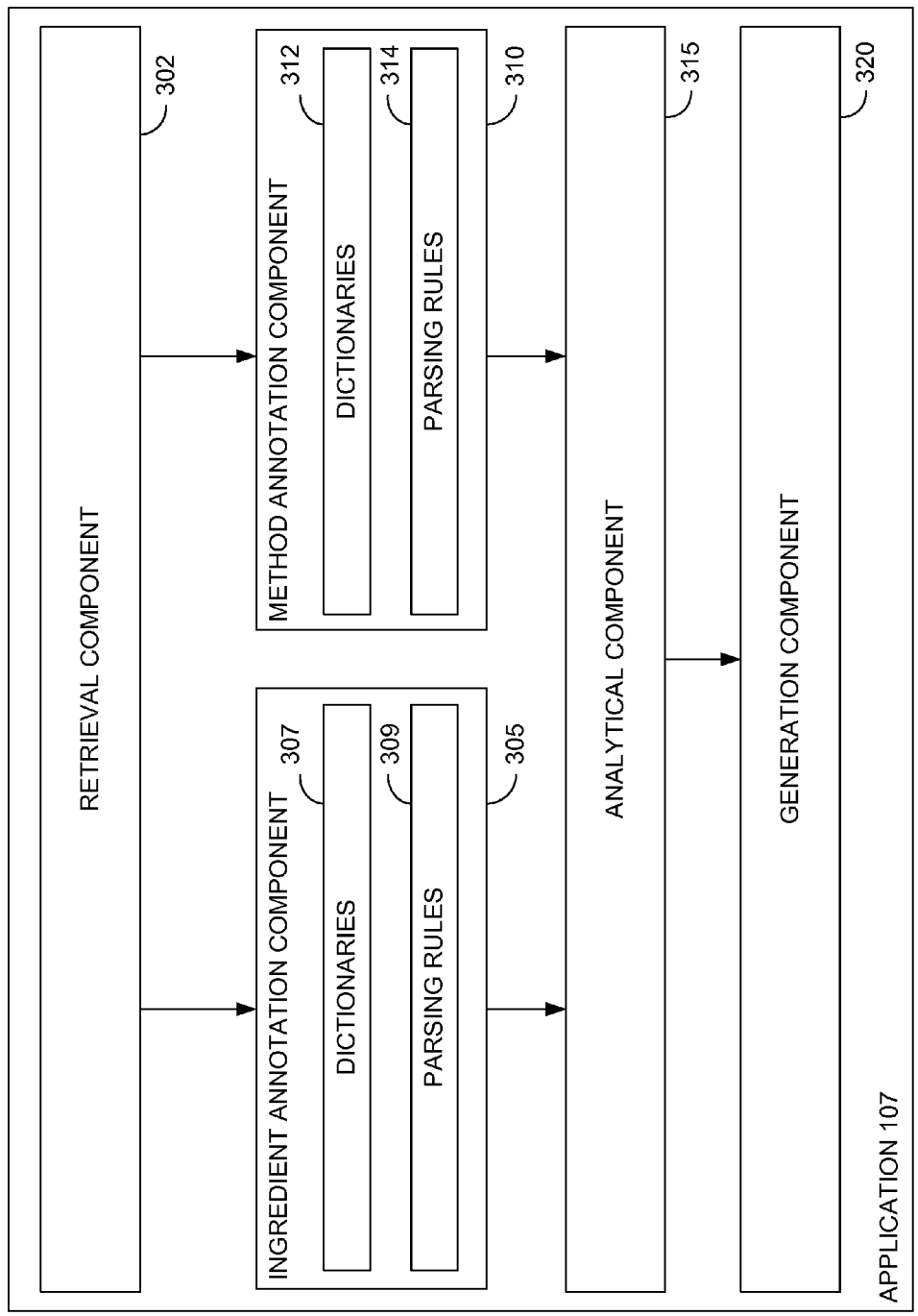
FIG. 3 illustrates an application executing on a server computer, according to one embodiment.

FIG. 3 illustrates the application 107 executing on the server computer 105, according to one embodiment. As shown, the application 107 includes a retrieval component 302, an ingredient annotation component 305, a method annotation component 310, an analytical component 315, and a generation component 320. The application 107 may process search queries sent by a user and, in response, generate a recipe by processing unstructured recipe texts related to the search.

The retrieval component 302 may obtain recipe texts from various sources. Examples of such sources include culinary recipe websites, food blogs, scanned cookbooks, local databases, and the like. In one embodiment, the retrieval component 302 may scrape each source for recipe texts for any recipe on a periodic basis and store the texts locally (e.g., in a database) for faster retrieval. Once recipe texts corresponding to the dish identified in the search query are retrieved, the retrieval component 302 may extract the text from each recipe and transmit the text to the ingredient annotation component 305 and the method annotation component 310.

The ingredient annotation component 305 is configured to process the extracted text to identify ingredients for a requested recipe using text analytics, such as natural language processing. As shown, the ingredient annotation component 305 itself includes dictionaries 307 and parsing rules 309. The dictionaries 307 and the parsing rules 309 are a collection of lexical, semantic, and tokenization instructions used on the extracted and unstructured text to separate specific terms (i.e., ingredients) from common language constructs (e.g., verbs, phrases, etc.). The ingredient annotation component 305 then identifies which ingredients are common to the requested recipe. In addition, the ingredient annotation component 305 may identify uncommon or unusual ingredients to the requested recipe. To do so, the ingredient annotation component 305 may determine how frequently a given ingredient appears in the collected recipe texts.

Further, the ingredient annotation component 305 may also filter false positive information in identifying ingredients. For example, consider the use of the term "cinnamon" in the sentence "Add 1 tbsp. of cinnamon," in light of, "My dog Cinnamon loves this dish." The ingredient annotation component 305 may identify the term "cinnamon" in the first sentence as an ingredient based on its placement within the sentence.

In addition, the ingredient annotation component 305 may also assign metadata about each identified ingredient. For example, such metadata may include a type of ingredient (e.g., meat, vegetable, spice, etc.), whether the ingredient is fresh or packaged, nutritional information, and the like. To determine such information, the ingredient annotation component 305 may process the identified ingredients through dictionaries that specify ingredient types, nutritional information, etc.

The method annotation component 310 analyzes the extracted text to identify preparation methods and steps for a requested recipe. As shown, the method annotation component 310 itself includes dictionaries 312 and parsing rules 314. The dictionaries 312 and parsing rules 314 are a collection of lexical, semantic, and tokenization instructions that are used to identify specific steps from common language constructs. The method annotation component 310 may identify which preparation methods and steps are common and uncommon to a specific dish. To do so, the method annotation component 310 may determine how common a preparation method is based on a frequency of the step in different recipes. Further, the method annotation component 310 may assign metadata about each identified step and method. For example, such metadata may include an amount of time spent per step, temperatures used in each step, whether the step is an example of a certain preparation (e.g., frying, baking, etc.), and the like.

The analytical component 315 is configured to perform a variety of analytics on the text and metadata annotated by the ingredient annotation component 305 and the method annotation component 310. By doing so, the analytical component may loosely predict whether a culinary recipe conforms to criteria specified in a search query. For example, if the search query submitted by specifies that the resulting culinary recipe must be low sodium, the analytical component 315 may filter ingredients that are high in sodium. To do so, the analytical component may disregard ingredients that are known to be high in sodium, such as processed ingredients, brined ingredients, soy sauces, etc. For example, the ingredient annotation component 305 may identify canned olives as a common ingredient to a vegetable lasagna dish. If the search query specifies requests a recipe for a particular dish but have a low sodium preparation, then the analytical component 305 may filter canned olives from the generated recipe because canned olives are typically marinated in brine, which results in a higher sodium levels. Further, the analytic component 315 may factor the high sodium content of canned olives into an analysis of whether to include canned olives in the final generated recipe.

Further, analytic component 315 may be configured to receive additional information about the user sending the search query (or other individual) to assist in performing predictive analytics to generate the recipe. For instance, the information may include medical conditions, allergies, etc., that the user may have. In turn, the analytical component 315 may establish predictive models that determine a recipe adhering to a dietary plan for the medical condition. For example, if the analytical component 315 receives information that indicates that the user has diabetes, then the analytical component 315 may identify ingredients and methods, based on the text previously annotated, that provides a low yield of sugar and carbohydrates. Conversely, the analytical component 315 may filter ingredients high in sugar and carbohydrates.

The generation component 320 is configured to create a culinary recipe that conforms to the user's search based on the data transmitted by the analytical component 315. Further, the generation component 320 may be configured to alternatively present the user with a variety of ingredients and cooking methods for a particular recipe. The user may then select from the variety of ingredients and cooking methods and submit the selection to the application 107. When the application 107 receives a selection of ingredients and methods from the user, the generation component 320 may create a recipe based on the selection and return the generated recipe to the user.

Figure 4:
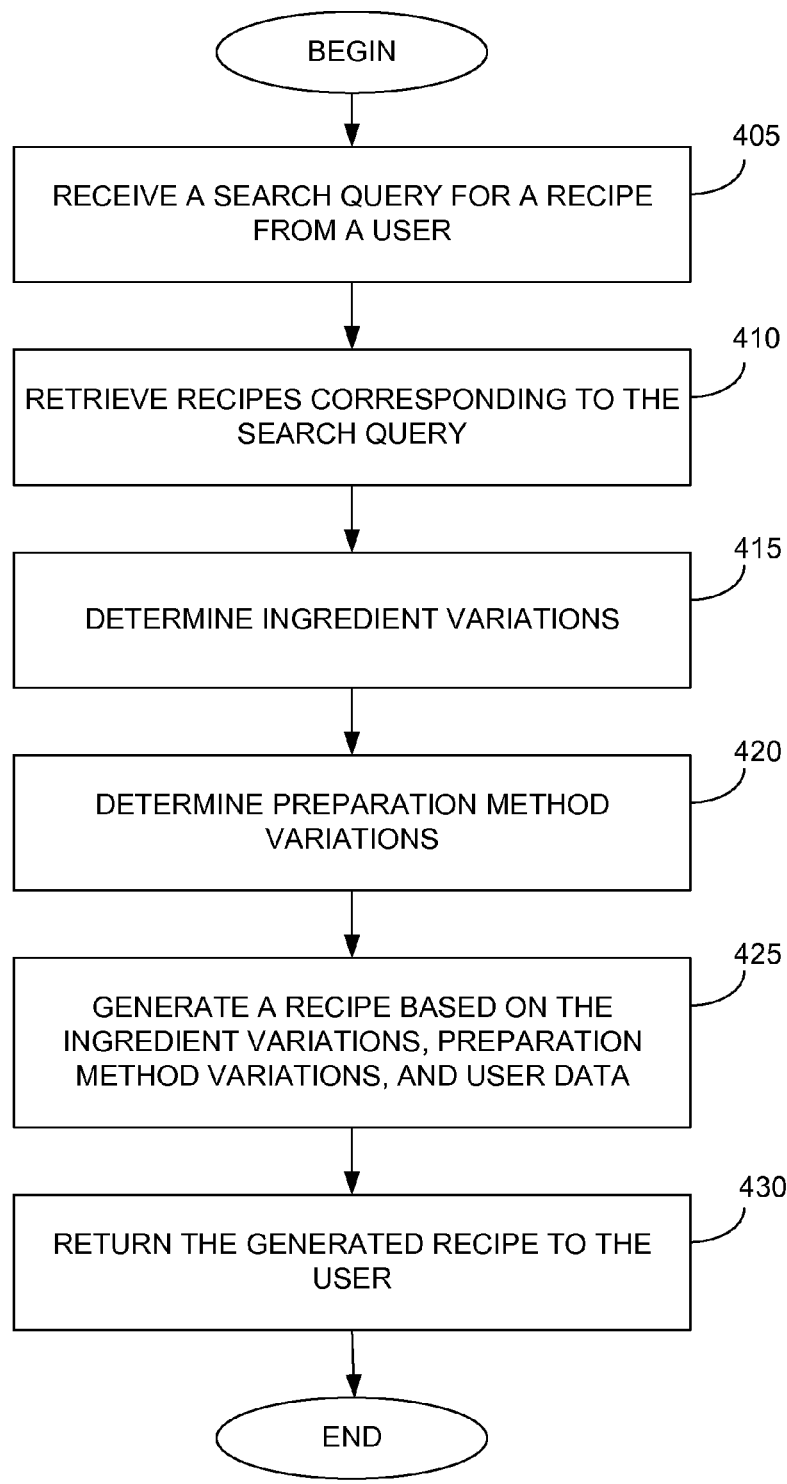
FIG. 4 illustrates a method for generate recipes using text analytics, according to one embodiment.

FIG. 4 illustrates a method 400 for generating a culinary recipe, according to one embodiment. A user may submit a search query for a culinary recipe through an application executing on a client computer to an application on a server computer. Assume that the search query corresponds to the example information provided in the interface 200, where a user searches for a low-sodium vegetarian lasagna dish that excludes mushrooms as an ingredient.

At step 405, the server application receives a search query for a recipe from the user. At step 410, the application retrieves relevant recipes corresponding to the search query. The application performs a crawl search through various recipe sources, such as recipe websites, food blogs, local databases, and the like to obtain the recipes. The application extracts the text from each of the collected recipes and applies dictionaries and parsing rules to identify ingredient variations and different preparation methods associated with the requested recipe. Continuing the example, the application retrieves recipes that are relevant to vegetable lasagna from the recipe sources and extracts the text from each available recipe. Doing so allows the application to analyze the recipes to derive a variety of linguistic and statistical data about the requested recipe.

At step 415, the application determines ingredient variations for the dish associated with the various recipes obtained. The application identifies ingredients that are common to a given dish and also identifies ingredients that are uncommon by analyzing the unstructured text of each collected recipe. To do so, the application may determine how frequently a given ingredient appears in the recipe and among other collected recipes. For example, the application may determine that ingredients common to vegetable lasagna may include lasagna noodles, spinach, and olives, while uncommon ingredients may include pepperoncini and avocado. Further, the application may also assign metadata to each ingredient, such as nutritional information, nutritional properties, whether an ingredient is processed or fresh, related ingredients, etc. Doing so allows the application to determine, for example, certain ingredients that may be substituted for other ingredients in the resulting recipe.

At step 420, the application determines variations in preparing specified dish. The application identifies cooking methods and steps that are common and uncommon in preparing a given dish. To do so, the application may determine how frequently a given step appears in each of the recipes identified at step 410. For example, the application may determine that boiling lasagna noodles is a common step in preparing lasagna. Further, the application may also assign metadata to each step, such as time information, temperature information, and the like.

At step 425, the application evaluates the annotated ingredient and cooking method data and generates a culinary recipe based on the ingredient variations, cooking method variations, and the search criteria. The application may rank certain ingredients based on the frequency at which the ingredient appears in other recipes, the nutritional information of each ingredient, and other metrics. Further, the application may also remove ingredients and methods that do not conform to criteria specified in the recipe search. Returning to the example from above, the search query specifies to exclude mushrooms, and in response, the application excludes mushrooms from the recipe and identifies alternatives that can be used in place of mushrooms. Further, assume that the application identifies canned olives as a common ingredient. However, because the request specifies that the generated recipe should be low sodium, the application may determine that canned olives are high in sodium because they are typically marinated in brine, and as a result, the application may exclude canned olives in the generated recipe. Additionally, the application may use data associated with the user in generating the recipe. Such data may include patient charts and other information that indicates medical conditions that the user has. The application may adjust the generated recipe according to the data. For example, if the user data specifies certain allergies, the application may exclude ingredients that aggravate such allergies and supplement the ingredients with alternatives. At step 430, the application returns the generated recipe to the user.

Alternatively, the application may present the user with a list of result ingredients and methods to choose in creating the recipe. For example, the list may include the top ten most common ingredients and the top ten most uncommon ingredients for the requested dish. Further, the list may also include the most common and uncommon preparation methods for the requested dish. Once the user receives the list, the user may select which ingredients and preparation methods to use in the final recipe and submit the result to the application. In turn, the application generates the recipe based on the user selection.

Figure 5:
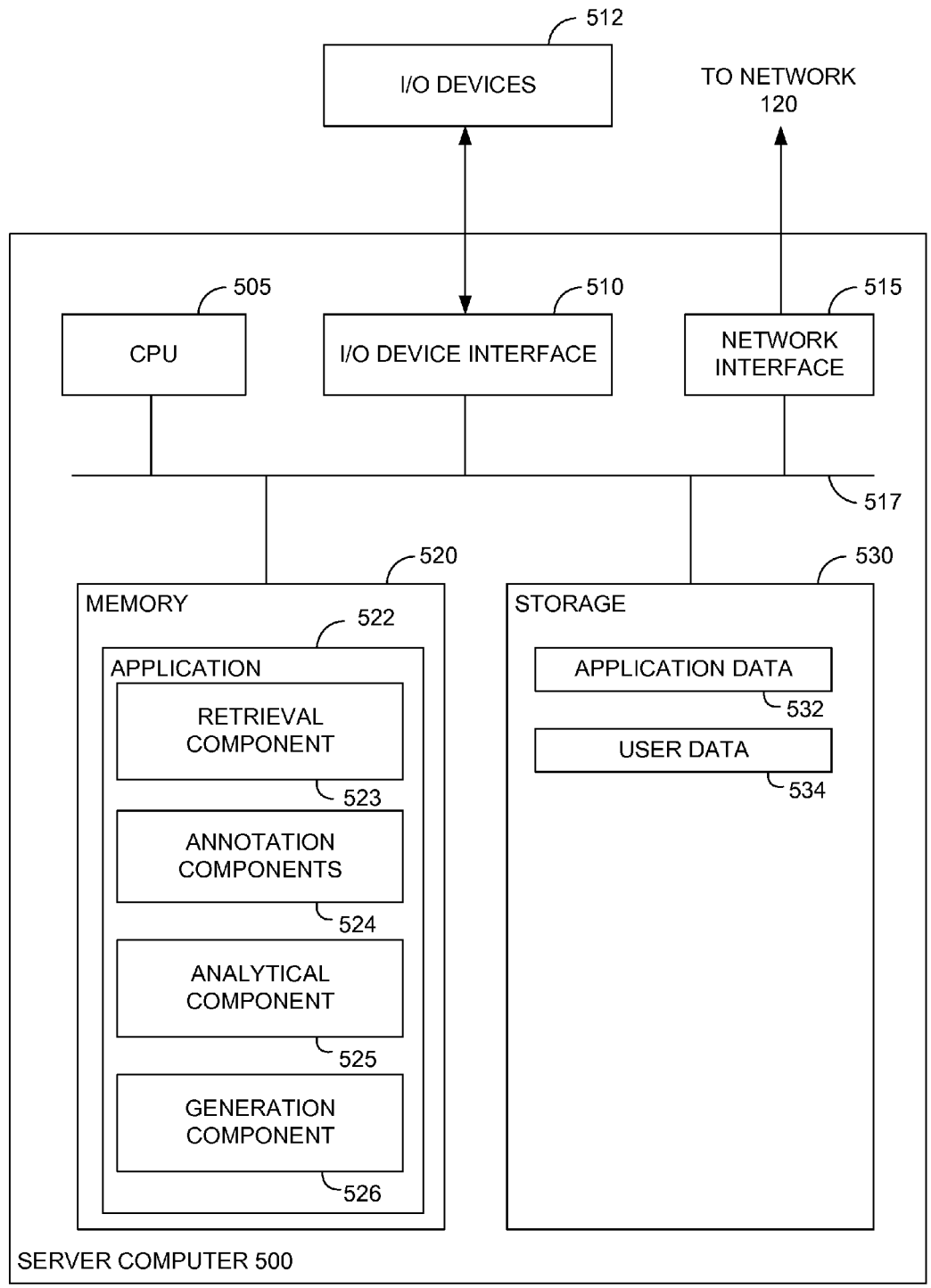
FIG. 5 illustrates an example server computing system configured to generate recipes using text analytics, according to one embodiment.

FIG. 5 illustrates an example server computing system 500 configured to generate culinary recipes using text analytics, according to one embodiment. As shown, computing system 500 includes, without limitation, a central processing unit (CPU) 605, a network interface 515, a memory 520, and storage 530, each connected to a bus 517. Computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

CPU 505 retrieves and executes programming instructions stored in memory 520 as well as stores and retrieves application data residing in the storage 630. The interconnect 517 is used to transmit programming instructions and application data between CPU 505, I/O devices interface 510, storage 530, network interface 515, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes an application 522. Storage 530 includes application data 532 and user data 534. Application 522 receives search queries and generates a culinary recipe based on the search query using text analytics. Application 522 itself includes a retrieval component 523, annotation components 524, an analytical component 525, and a generation component 526. The retrieval component 523 collects culinary recipes that are relevant to the search query from a variety of recipe sources (e.g., recipe websites, food magazines, food blogs, etc.) and extracts text from the recipes. The annotation components 524 use a set of dictionaries and parsing rules to identify and annotate ingredients and preparation methods for the recipe. The analytical component 525 creates predictive models based on the annotated data to identify a recipe that conforms to the search query (and the user data 534). The generation component 526 generates the final recipe and presents the recipe to the user.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described, embodiments presented herein provide techniques for generating a culinary recipe using text analytics methods. Advantageously, using text analytics on a number of unstructured recipes for a particular dish allows many different possibilities for preparing the dish to be identified. Performing further analytics on the possible ingredients and preparation methods results in a recipe that conforms to the requests of a user as well as the user's dietary needs.

While the foregoing is directed to embodiments of the present invention, other and further embodiments of the invention may be devised without departing from the basic scope thereof, and the scope thereof is determined by the claims that follow.

What is claimed is:

1. A computer program product, the computer program product comprising:
    a non-transitory computer-readable storage medium having computer-readable program code embodied therewith, the computer-readable program code having instructions for causing a processor to perform an operation, the operation comprising:
        receiving a recipe request, wherein the recipe request specifies a dish and a set of criteria;
        retrieving a plurality of recipe texts corresponding to the specified dish;
        parsing each of the recipe texts to identify one or more ingredients and one or more methods used in preparing the specified dish and to associate metadata to one or more of the identified ingredients and methods;
        generating, from the associated metadata of the identified ingredients and methods, a statistical model for preparing the specified dish, wherein the statistical model distinguishes between common and uncommon ingredients and methods for preparing the specified dish using a frequency of appearances in the parsed recipe texts;
        identifying substitutions satisfying the specified set of criteria based on the common and uncommon ingredients and methods; and
        generating a combination of the identified ingredients and methods for preparing the specified dish based on the specified set of criteria and the statistical model, wherein the combination includes at least one of the identified substitutions.

2. The computer program product of claim 1, wherein the plurality of recipe texts are retrieved from online recipe websites and local databases.

3. The computer program product of claim 1, wherein the set of criteria includes nutritional information, preferred ingredients, and ingredients to exclude from the generated combination.

4. The computer program product of claim 3, wherein the set of criteria further includes medical information and dietary restrictions associated with a user.

5. The computer program product of claim 1, wherein the operation further comprises:
returning at least one of the identified ingredients and methods to a client computer, wherein the client computer sent the recipe request;
receiving a selection one or more of the at least one of the identified ingredients and methods; and
generating a combination of the identified ingredients and methods based on the selection.

6. The computer program product of claim 1, wherein the metadata associated with the identified ingredients includes a type, nutritional information, and whether the ingredient is common to the specified recipe, and wherein the metadata associated with the identified methods includes cooking times and preparation temperatures.

7. A system, comprising:
a processor, and;
a memory storing a program, which, when executed on the processor, performs an operation, the operation comprising:
receiving a recipe request, wherein the recipe request specifies a dish and a set of criteria;
retrieving a plurality of recipe texts corresponding to the specified dish;
parsing each of the recipe texts to identify one or more ingredients and one or more methods used in preparing the specified dish and to associate metadata to one or more of the identified ingredients and methods;
generating, from the associated metadata of the identified ingredients and methods, a statistical model for preparing the specified dish, wherein the statistical model distinguishes between common and uncommon ingredients and methods for preparing the specified dish using a frequency of appearances in the parsed recipe texts;
identifying substitutions satisfying the specified set of criteria based on the common and uncommon ingredients and methods; and
generating a combination of the identified ingredients and methods for preparing the specified dish based on the specified set of criteria and the statistical model, wherein the combination includes at least one of the identified substitutions.

8. The system of claim 7, wherein the plurality of recipe texts are retrieved from online recipe websites and local databases.

9. The system of claim 7, wherein the set of criteria includes nutritional information, preferred ingredients, and ingredients to exclude from the generated combination.

10. The system of claim 9, wherein the set of criteria further includes medical information and dietary restrictions associated with a user.

11. The system of claim 7, wherein the operation further comprises:
returning at least one of the identified ingredients and methods to a client computer, wherein the client computer sent the recipe request;
receiving a selection one or more of the at least one of the identified ingredients and methods; and
generating a combination of the identified ingredients and methods based on the selection.

12. The system of claim 7, wherein the metadata associated with the identified ingredients includes a type, nutritional information, and whether the ingredient is common to the specified recipe, and wherein the metadata associated with the identified methods includes cooking times and preparation temperatures.

* * * * *